Figure 1:
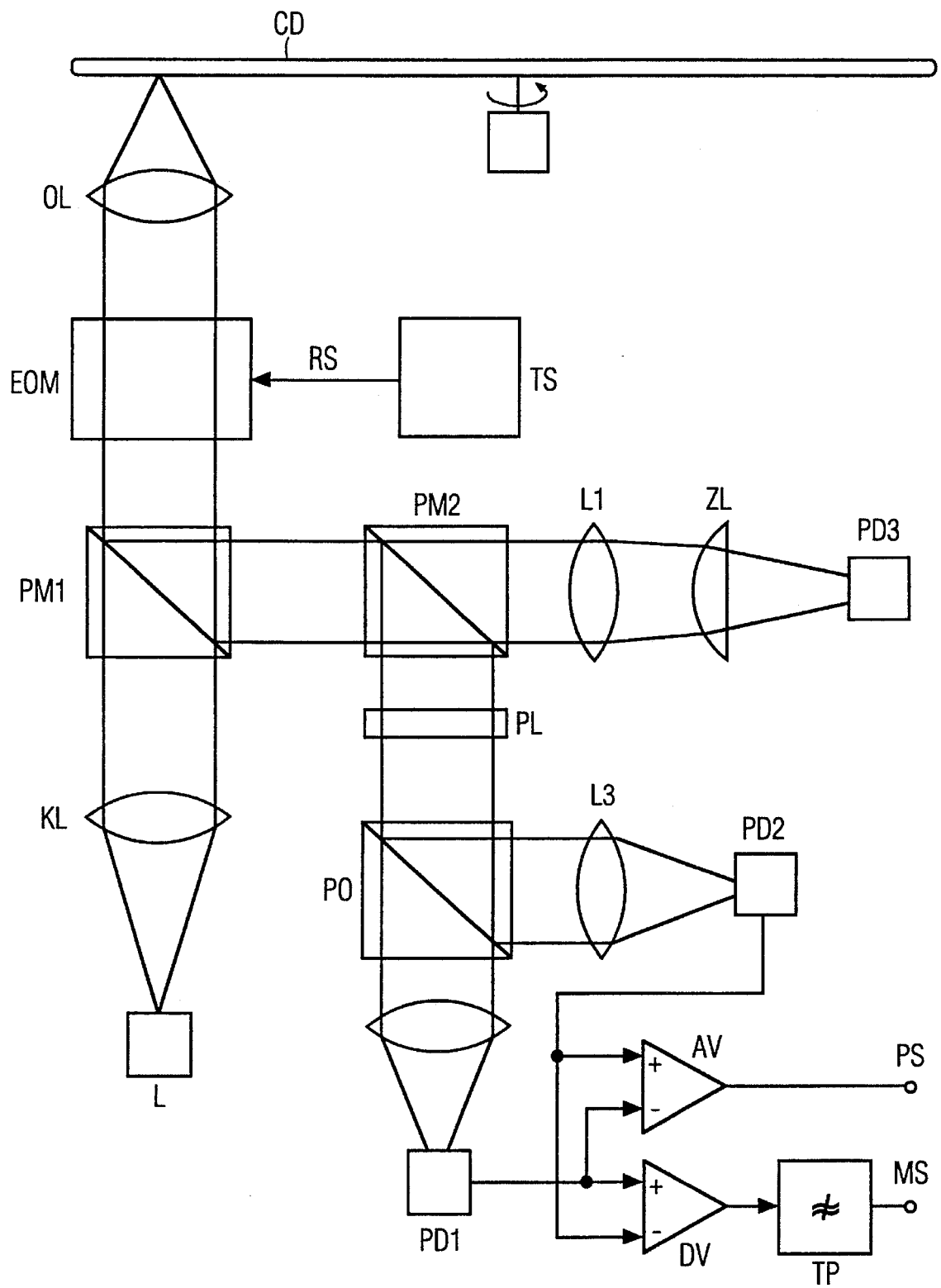

United States Patent [19]

Morimoto

[11] Patent Number: 5,459,707
[45] Date of Patent: Oct. 17, 1995

[54] READ/WRITE CD ROM SYSTEM USING AN ELECTRO-OPTIC MODULATOR TO CROSSTALK

[75] Inventor: Yasuaki Morimoto, Sakura, Japan

[73] Assignee: Deutsche Thomson-Brandt GmbH, Villengen-Schwenningen, Germany

[21] Appl. No.: 196,162

[22] PCT Filed: Aug. 13, 1992

[86] PCT No.: PCT/EP92/01850

§ 371 Date: May 19, 1994

§ 102(e) Date: May 19, 1994

[87] PCT Pub. No.: WO93/04471

PCT Pub. Date: Mar. 4, 1993

[30] Foreign Application Priority Data

Aug. 22, 1991 [DE] Germany .......................... 41 27 840.2

[51] Int. Cl.[6] ...................................................... G11B 7/00
[52] U.S. Cl. .................. 369/110; 369/44.23; 369/44.41; 369/13; 369/112
[58] Field of Search .................................. 369/44.32, 13, 369/44.41, 44.42, 44.23, 44.24, 109, 110, 112, 124, 120; 359/246

[56] References Cited

U.S. PATENT DOCUMENTS

| | | | |
|---|---|---|---|
| 4,160,270 | 7/1979 | Goldschmidt et al. | 369/110 |
| 4,264,986 | 4/1981 | Willis | 369/110 |
| 5,045,868 | 9/1991 | Tajima | 369/44.24 |
| 5,134,512 | 7/1992 | Hiwada | 359/246 |
| 5,245,465 | 9/1993 | Tomita et al. | 359/246 |
| 5,258,968 | 11/1993 | Matsuda et al. | 369/44.32 |
| 5,325,350 | 6/1994 | Morimoto et al. | 369/110 |

FOREIGN PATENT DOCUMENTS 3732875  4/1989  Germany .

OTHER PUBLICATIONS

Patent Abstracts of Japan, P. Sektion, Band 7, Nr. 160, 14 Jul. 1983, The Patent Office Japanese Government, siehe Seite 45, p. 210; Kokai–no 58–68250 (TEAC K.K.).
Patent Abstracts of Japan, P. Sektion, Band 8, Nr. 254, 21 Nov. 1984, The Patent Office Japanese Government, siehe Seite 1, p. 315; Kokai–no. 59–124044 (Toshiba K.K.).

*Primary Examiner*—Georgia Y. Epps
*Assistant Examiner*—Nabil Hindi
*Attorney, Agent, or Firm*—Joseph S. Tripoli; Eric P. Herrmann

[57] ABSTRACT

In a CD system of the type which stores data in both pits and magnetic domains, crosstalk injected into the signal recovered from the magnetic domains is significantly reduced by causing the modulator used to record the magnetically stored signal, to rapidly switch the direction of polarization of the laser light used to read the magnetically recorded signal. This tends to introduce a signal component which is similar to, but opposite in phase, the crosstalk created by the edges of pits recorded under the magnetic layer. This signal is inherently combined with the crosstalk components at the signal recovery circuitry and significantly reduces or cancels the pit induced crosstalk.

8 Claims, 4 Drawing Sheets ated by the laser beam in the one or the other
READ/WRITE CD ROM SYSTEM USING AN ELECTRO-OPTIC MODULATOR TO CROSSTALK The invention relates to an optical scanning device which is suitable for reading both an optical and a magneto-optic recording medium as well as a magneto-optic recording medium upon which items of data are stored above one another both in a magnetic layer and by means of so-called pits, wherein the light beam from a light source is focused on the recording medium and is reflected from the recording medium through a polarization beam splitter onto a first photodetector and, after being deflected by the polarization beam splitter, onto a second photodetector.

A known optical recording medium is, for example, the CD disc in which a light reflecting aluminium layer follows on the transparent layer. The light reflecting aluminium layer has depressions, so-called pits, which represent the items of data stored on the CD disc. The items of data are readable from the CD disc by means of an optical scanning device because the reflective behaviour of the light reflecting aluminium layer depends on the pattern which the depressions form on the disc. Less light is reflected from a depression, frequently also called a groove, than from a raised area which is often also referred to as a land.

From the intensity of the light reflected from the CD disc, the optical scanning device therefore recognises whether the scanned bit relates for example, to a logical one or a logical zero.

A further optical recording medium of this type, known under the designation of a magneto-optic disc, is described in the article "Magnetooptische Versuche dauern an" in Funkschau 13, 20, Jun. 1986 at pages 37–41.

In contrast to a conventional CD disc, a magneto-optic disc does not have any pits. A magnetic layer, in which items of data are recordable and from which items of data are readable, is located behind the transparent layer. It will now be explained how items of data are written onto a magneto-optic disc.

The magnetic layer is heated above the Curie temperature by means of a laser beam focused onto the disc. Usually however, it is only necessary to heat up the magnetic layer to the compensation temperature which lies somewhat under the Curie temperature. An electro-magnet, which magnetises the region heated by the laser beam in the one or the other direction of magnetisation, is arranged behind the focal point on the disc. Because, after switching off the laser beam, the heated spot cools once more below the Curie temperature, the direction of magnetisation determined by the electro-magnet is maintained: it is, so to speak, frozen in. The individual bits are stored in this manner in domains of different directions of magnetisation. Thereby, the one direction of magnetisation of a domain corresponds, for example, to a logical one, while the opposite direction of magnetisation represents a logical zero.

One makes use of the Kerr effect for reading the items of data. The plane of polarization of a linearly polarized light beam is rotated by the reflection at a magnetised mirror by a measurable angle. In dependence upon the direction in which the mirror is magnetised, the plane of polarization of the reflected light beam is rotated to the right or to the left. However, because the individual domains on the disc act like magnetised mirrors, the plane of polarization of a scanning light beam is rotated by a measurable angle to the left or to the right in dependence upon the direction of magnetisation of the currently scanned domain.

The optical scanning device recognises which bit is present, a logical one or a logical zero, from the rotation of the plane of polarization of the light beam reflected from the disc. In contrast to a CD disc having pits, a magneto-optic disc is erasable and re-writable virtually as often as desired.

A disc shaped recording medium which represents a combination of an optical and a magneto-optic disc is known from DE-OS 37 32 875. Items of data are stored on this recording medium by means of pits and also in the magnetic layer of the disc. Because the pits and the magnetic domains lie above one another, items of data are stored at one and the same place in the form of pits as well as in the magnetic layer. The storage capacity of this disc is therefore twice as great as that of a normal optical disc or a magneto-optic disc.

An optical scanning device is discussed in the DE-OS 37 32 874 which is suitable for the three types of disc mentioned, since this optical scanning device is able to read items of data from an optical disc, e.g. a compact disc, a magneto-optic disc as well as from a disc that is known from the DE-OS 37 32 875.

In this optical scanning device,, the light from a laser is focused onto the disc and reflected from there to a polarization beam splitter which, in dependence on its direction of polarization, reflects it either onto a first or a second photodetector. The data signal, which is stored in the magnetic domains of the disc, is obtained from the difference of the photo voltages of the first and the second photodetector. That data signal, which reproduces the items of data stored on the disc by means of the pits, is produced from the sum of the photo voltages of the first and the second photodetector. The optical scanning device described in DE-OS 37 32 874 may, in a disc such as is specified in DE-OS 37 32 875, simultaneously read both the items of data stored by means of the pits and the items of data stored in the magnetic domains.

However, because the pits likewise cause a—if only very small— rotation of the direction of polarization of the light emitted by the laser, cross-talk between the data signal obtained by scanning the pits and the data signal read from the magnetic domains with the aid of the Kerr effect cannot be completely avoided. In order to sufficiently dampen this cross-talk, minimum separations between the individual data tracks as well as a minimum length and a minimum breadth of the pits have to be observed. However, these minimum dimensions restrict the storage capacity of the recording medium.

The object of the invention therefore is to suppress the undesired cross-talk as completely as possible.

The invention achieves this object in that, in the beam path of the light emitted from the light source, there lies an electro-optic polarization modulator which periodically tilts the electric vector of the light focused onto the recording medium alternately parallel and perpendicular to the scanned data track of the recording medium at a frequency which is selected to be substantially greater than the frequency of the signals recorded on the recording medium, that the output of the first and of the second photodetector are connected to the inputs of a summing amplifier from whose output the data signal obtained by means of the pits is derivable, that the outputs of the first and second photodetector are connected to the inputs of a differential amplifier whose output is connected to the input of a low pass filter and that the data signal obtained from the magnetic layer is derivable at the output of the low pass filter.

There is shown in

Figure 2:
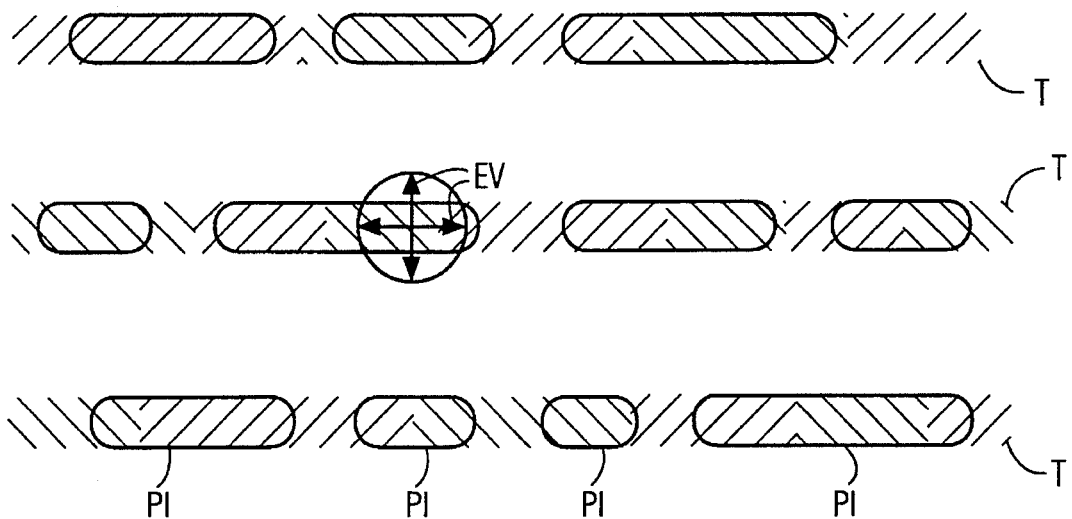
Figure 3:
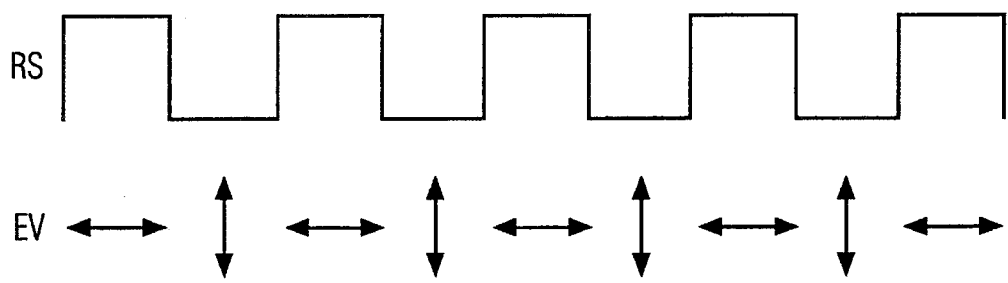
Figure 4:
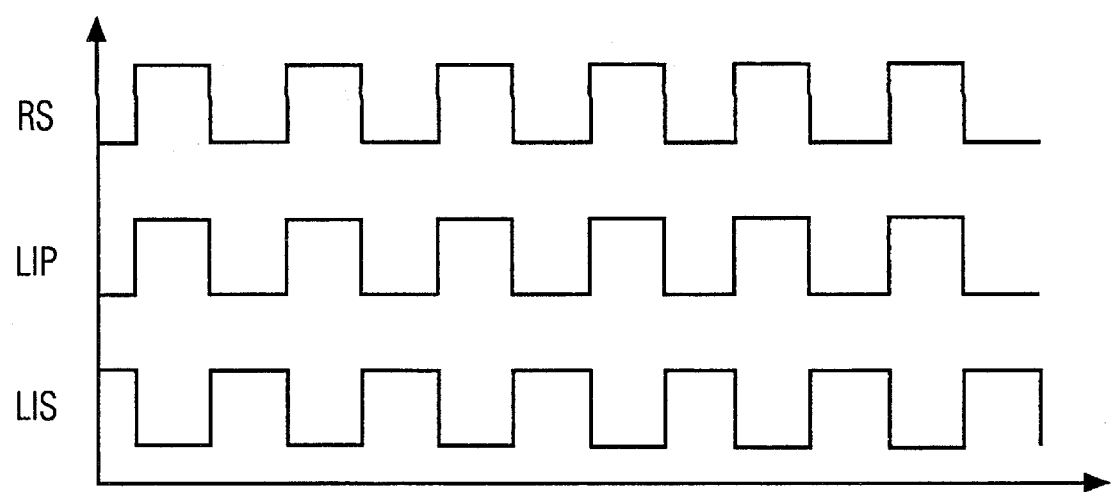
Figure 5:
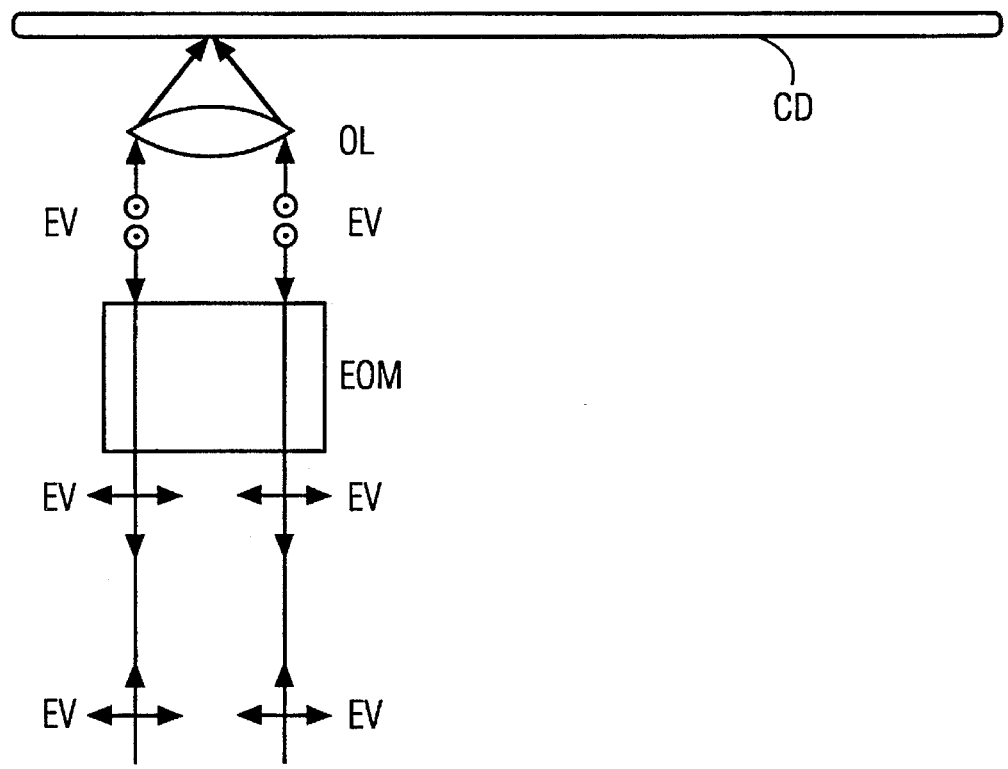
Figure 6:
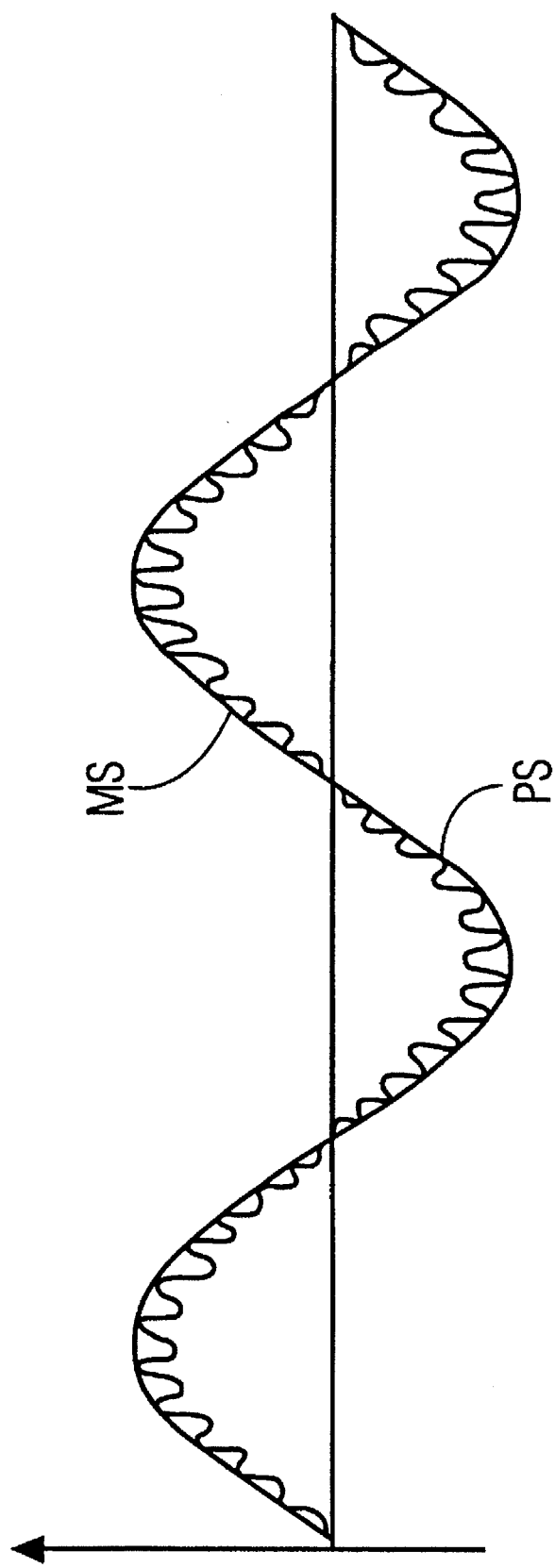

FIG. 1 an embodiment of the invention;

FIG. 2 the location of the electric vector on the data track of the recording medium;

FIG. 3 the rectangular control signal controlling the opto-electric modulator and the appertaining location of the electric vector on the data track;

FIG. 4 the intensity of the light in the two planes of polarization which are located perpendicular to each other, in dependence on the rectangular control signal;

FIG. 5 the direction of the electric vector in front of and behind the electro-optic modulator;

FIG. 6 the cross-talk in the magnetic data signal.

The embodiment illustrated in FIG. 1 will now be described and thereafter explained.

The light emitted from a light source L, for example, a laser diode, shines through a collimating lens KL, a prismatic beam splitter PM1 and an electro-optic modulator EOM onto an objective lens OL which focuses the light onto a recording medium CD e.g. a magneto-optic disc. The light is reflected back from the magneto-optic disc CD to the objective lens OL, to the electro-optic modulator EOM and to the prismatic beam splitter PM1 which deflects it through a right angle to a prismatic beam splitter PM2. A portion of the light passes through the prismatic beam splitter PM2 to a convex lens L1 and then further to a cylindrical lens ZL which directs the light onto a photodetector PD3 that is formed as a four quadrant photodetector. The prismatic beam splitter PM2 deflects a portion of the light however through a right angle onto a λ/2 plate from where the light reaches a polarization beam splitter PO. In dependence on the direction of polarization of the light transmitted to the polarization beam splitter PO, a portion is passed on in a straight line to a convex lens L2 which directs it onto a photodetector PD1. The other portion of the light is deflected to a convex lens L3 which directs it onto a photodetector PD2. The output of the photodetector PD1 and the output of the photodetector PD2 are connected to the inputs of a summing amplifier AV and a differential amplifier DV. The data signal PS obtained by means of the pits is derivable at the output of the summing amplifier AV. The data signal MS obtained from the magnetic layer of the magneto-optic disc CD is derivable at the output of a low pass filter TP whose input is connected to the output of the differential amplifier DV. The control input of the electro-optic modulator is connected to the output of a driver circuit TS which generates a rectangular control signal.

Three data tracks T of the recording medium having pits PI are illustrated in FIG. 2. The direction of magnetisation of the data tracks is indicated by the different hatchings. The electric vector EV of the light focused onto the magneto-optic disc is either parallel to the direction of the track or is perpendicular to the direction of the track.

The rectangular control signal RS for the electro-optic modulator generated by the driver circuit TS is shown in FIG. 4. The light intensity LIP in the direction of the track and the light intensity LIS perpendicular to the direction of the track is shown therebelow. The electric vector is parallel to the direction of the track during a pulse of the rectangular control signal RS. Consequently, during a pulse of the control signal RS, the light intensity as seen in the direction of the data track is likewise synchronous with the rectangular pulses of the control signal RS.

In contrast, during a pulse break in the control signal RS, the electric vector is perpendicular to the direction of the track. Consequently, during the pulse breaks, the light intensity as seen perpendicularly to the direction of the track is pulse-like. The light intensity as seen in the direction of the data track is therefore of opposite phase to the light intensity as seen perpendicularly to the data track.

For a better understanding, the rectangular control signal RS of the driver circuit TS is depicted once more in FIG. 3. Below the rectangular control signal RS, the location of the electric vector EV on the data track is shown in the correct sequence. During a pulse, the electric vector EV is parallel to the data track whilst it is perpendicular to the data track during a pulse break. The electro-optic modulator EOM periodically tilts the electric vector EV into the parallel position and then back into the perpendicular position.

The direction of the electric vector EV in front of and behind the electro-optic modulator EOM is indicated in FIG. 5. The electro-optic modulator EOM causes the electric vector EV of the light directed by it onto the magneto-optic disc to be alternately parallel and perpendicular to the data track. In contrast, the electric vector EV of the light which is reflected by the magneto-optic disc and which passes through the electro-optic modulator EOM is always parallel to the electric vector of the light emitted by the laser diode L.

The frequency of the rectangular control signal RS generated by the driver circuit TS is selected to be substantially greater than the frequency of the data signals PS and MS read from the magneto-optic disc CD. The frequency of the rectangular control signal RS amounts, for example, to 50 MHz whilst the frequency of the data signal PS obtained by means of the pits and the frequency of the data signal MS obtained from the magnetic layer amounts at most to 720 KHz in a CD player.

However, as a result of the finite switching speed of the electro-optic modulator and as a result of the finite speed of light, the electric vector of the light emitted by the electro-optic modulator has rotated a little further when the light reflected from the magneto-optic disc arrives at the electro-optic modulator. Therefore, because the electric vectors of the light emitted by the electro-optic modulator and the light reflected back from the magneto-optic disc to the electro-optic modulator are not exactly parallel, whilst the electric vector EV is tilting into the other position, elliptically polarized light, whose interference effect is however negligible, is produced during the tilting of the electric vector EV.

The invention is now based on the first appreciation that cross-talk in the magneto-optic data signal MS is caused by an unwanted rotation of the plane of polarization due to reflection at the edges of the pits. Furthermore, the invention is based on the second appreciation that, for an electric vector running parallel to the direction of the track, the amplitudes of the cross-talk products are of approximately the same size but of opposite polarity visa vis an electric vector which is perpendicular to the direction of the track.

Because the rotation frequency of the electric vector is now selected to be substantially greater than the frequency of the data signals, each pit is scanned several times by the electric vector which is parallel to the direction of the track and by the electric vector which is perpendicular to the direction of the track. Moreover, because the cross-talk products for an electric vector parallel to the direction of the track have an approximately equal magnitude but opposed polarity visa vis those for an electric vector which is perpendicular to the direction of the track, they cancel each other out to a great extent. In other words, this means that the light reflected to the photodetectors PD1 and PD2 is virtually free of cross-talk because the cross-talk products which are generated for an electric vector running parallel to the direction of the track and the cross-talk products which are generated for an electric vector that is perpendicular to the direction of the track mutually cancel.

The low pass filter at the output of the differential amplifier DV is required in order to filter out from the magneto-optic data signal MS, the frequency components which are generated by the rectangular control signal RS.

The data signal MS, which is obtained from the items of data stored in the magnetic layer of the recording medium and whose frequency may amount to e.g. 10 KHz, is shown in FIG. 6. The data signal MS is, however, superimposed with an oscillation of e.g. 100 KHz which is caused by the data signal that is obtained from the items of data stored by means of the pits. The amplitudes of the superimposed oscillation of 100 KHz are considerably reduced by the periodic rotation of the electric vector and as a result of the low pass filter at the output of the differential amplifier DV.

The invention is suitable for an optical recording and/or reproduction device which can read both optical and magneto-optic recording media as well as a combination of both. The invention can be used to advantage in the data processing art because items of data can be simultaneously read and recorded. However, for CD players and video disc players too, the invention offers the advantage for example, that sound and pictures can also be recorded simultaneously with the reproduction.

I claim:

1. Optical scanning device which is suitable for reading both an optical and a magneto-optic recording medium upon which items of data are stored above one another both in a magnetic layer and by means of so-called pits (PI), wherein a light beam from a light source (L) is focused on the recording medium (CD) and is reflected from the recording medium, (CD) through a polarization beam splitter (PO) onto a first photodetector (PD1) and, through said polarization beam splitter (PO), onto a second photodetector (PD2), and including an electro-optic polarization modulator (EOM) located between said regarding medium and said light source which periodically tilts the electric vector of the light focused onto the recording medium (CD) alternately parallel and perpendicular to the scanned data track of the recording medium (CD) at a frequency which is substantially greater than the frequency of signals recorded via said pits on the recording medium (CD), and wherein output signals of the first and second photodetectors (PD1, PD2) are connected to respective inputs of a summing amplifier (AV) for generating a data signal (PS) corresponding to information recorded via said pits and wherein the outputs of the first and second photodetectors (PD1, PD2) are connected to respective inputs of a differential amplifier (DV) having an output connected to an input of a low pass filter (TP) for producing a data signal corresponding to information recorded in said magnetic layer.

2. Optical scanning device in accordance with claim 1, wherein the electro-optic polarization modulator (EOM) is controlled by a driver circuit (TS) with a control signal (RS) in such a way that the electric vector (EV) of the light focused on the recording medium (CD) periodically lies alternately parallel and perpendicular to the scanned data track of the recording medium (CD).

3. Optical scanning device in accordance with claim 1, wherein said first and second photodetectors (PD1, PD2) are arranged so that light focused thereon has passed from said light source, through said electro-optic modulator to said recording medium, been reflected from said recording medium and passed again through said electro-optic modulator.

4. Optical scanning device in accordance with claim 2 wherein the control signal (RS) is a rectangular waveform with duty cycle of fifty percent.

5. Optical scanning device which is suitable for reading both an optical and a magneto-optic recording medium upon which items of data are stored above one another both in a magnetic, layer and by means of so-called pits (PI), wherein a light beam from a light source (L) is focused on the recording medium (CD) and is reflected from the recording medium (CD) through a polarization beam splitter (PO) onto a first photodetector (PD1) and, through said polarization beam splitter (PO), onto a second photodetector (PD2), the light produced by the light source (L) passes through a collimating lens (KL), a first prismatic beam splitter (PM1), an electro-optic modulator (EOM) and an objective lens (OL) which focuses the light beam onto the recording medium (CD), the electro-optic modulator is conditioned to periodically tilt the electric vector of the light focused onto the recording medium (CD) alternately parallel and perpendicular to the scanned data track of the recording medium (CD) at a frequency which is substantially greater than the frequency of signals recorded via said pits on the recording medium (CD), and wherein light reflected from s..aid recording medium passes through the objective lens (OL) and the electro-optic modulator (EOM) to the first prismatic beam splitter (PM1) which deflects the light to a second prismatic beam splitter (PM2), a non deflected portion of light passes through the second prismatic beam splitter (PM2) onto a third photodetector (PD3), a deflected portion of the light is directed by the second prismatic beam splitter (PM2) through a λ/2 plate (PL), a polarization beam splitter (PO) and a second convex lens (L2) onto the first photodetector (PD1), the polarization beam splitter (PO) deflects a portion of light through a third convex lens (L3) onto the second photodetector, the outputs of the first and second photodetector (PD1, PD2) are connected to respective inputs of a summing amplifier (AV) and to respective inputs of a differential amplifier (DV) the output of which is connected to a low pass filter (TP) from which a data .signal (MS) obtained from the magnetic layer is derivable, and wherein a data signal (PS) obtained from the pits is derivable from the output of the summing amplifier (AV).

6. Optical scanning device in accordance with claim 5, wherein the third photodetector (PD3) comprises a four quadrant photodetector.

7. Optical scanning device in accordance with claim 6, wherein a focusing error signal for focusing the light beam onto the recording medium (CD) is generated in known manner from output signals provided by the third photodetector (PD3).

8. Optical scanning device which is suitable for reading both an optical and a magneto-optic recording medium upon which items of data are stored above one another both in a magnetic layer and by means of so-called pits (PI), wherein a light beam from a light source (L) is focused on the recording medium (CD) and is reflected from the recording medium (CD) through a polarization beam splitter (PO) onto first and second photodetectors (PD1) and (PD2), the light produced by the light source (L) passes through a collimating lens (KL), a first prismatic beam splitter (PM1), an electro-optic modulator (EOM) and an objective lens (OL) which focuses the light beam onto the recording medium (CD), with the electro-optic modulator being conditioned by a square wave to periodically tilt the electric vector of the light focused onto the recording medium (CD) alternately parallel and perpendicular to the scanned data track at a frequency which is substantially greater than the frequency of signals recorded via said pits on the recording medium (CD), and wherein light reflected from said recording medium passes through the objective lens (OL) and the electro-optic modulator (EOM) to the first prismatic beam splitter (PM1) which deflects the light to a second prismatic beam splitter (PM2), which in turn deflects a portion of the light through a ½ plate (PL), a polarization beam splitter (PO) and a first convex lens (L2) onto the first photodetector (PD1), the polarization beam splitter (PO) deflects a portion of light through a second convex lens (L3) onto the second photodetector, the outputs of the first and second photodetectors (PD1, PD2) are connected to respective inputs of a summing amplifier (AV) and to respective inputs of a differential amplifier (DV), the output of which is connected to a low pass filter (TP) from which a data signal (MS) obtained from the magnetic layer is derivable, and wherein a data signal (PS) obtained from the pits is derivable from an output of the summing amplifier (AV).

* * * * *

UNITED STATES PATENT AND TRADEMARK OFFICE
CERTIFICATE OF CORRECTION

PATENT NO. : 5,459,707
DATED : October 17, 1995
INVENTOR(S) : Yasuaki Morimoto

It is certified that error appears in the above-identified patent and that said Letters Patent is hereby corrected as shown below:

On the cover page [54] Insert ---REDUCE--- after "TO" and before "CROSSTALK".

In column 5, line 29 after "medium" delete [ , ]

In column 5, line 33 after "between said" delete [regarding] and insert ---recording---

In column 6, line 2 delete [ , ] after "magnetic".

In column 6, line 18 delete [s..aid] and insert ---said---

In column 6, line 34 delete [.signal] and insert ---signal---

Signed and Sealed this

Twenty-seventh Day of May, 1997

Attest:

Attesting Officer

BRUCE LEHMAN

Commissioner of Patents and Trademarks